United States Patent Office 3,840,512
Patented Oct. 8, 1974

---

3,840,512
DEGRADABLE PLASTICS COMPOSITION
Derek Samuel Brackman, Stanmore, England, assignor to Imperial Chemicals Industries Limited, London, England
No Drawing. Filed Nov. 9, 1972, Ser. No. 304,949
Int. Cl. C08f 27/22, 27/28
U.S. Cl. 260—94.9 GC      11 Claims

ABSTRACT OF THE DISCLOSURE

Thermoplastics compositions, especially polyolefine compositions, contain a metal carboxylate plus a free carboxylic acid as a synergistic prodegradant. Iron stearate plus extra stearic acid is an effective mixture for low and high density polyethylene.

---

This invention relates to thermoplastics compositions.

The use of disposable plastics wrappings, containers and the like and their subsequent discarding, either intentionally or accidentally, has led to the problem of plastics litter. This invention relates to a plastics composition the use of which can alleviate the problem.

According to the invention a thermoplastics composition contains as prodegradant a free carboxylic acid and a metal salt of a carboxylic acid said metal having an atomic number of 22 to 29, each being present in such a concentration that:

(a) the total amount of metal salt+free carboxylic acid is between 0.001% and 40% by weight based on the total composition;
(b) the amount of free carboxylic acid is from 10% up to 95% by weight, preferably from 50% up to 90% by weight, of the total amount of metal salt plus free carboxylic acid.

The metals with atomic numbers 22 to 29 are Ti, V, Cr, Mn, Fe, Co, Ni and Cu; of these the preferred metals are iron and manganese.

The thermoplastics compositions described above include both end-use compositions and masterbatch compositions, i.e. compositions which contain high concentrations of additives and the utility of which is that they can be added to the pure polymer to give an end-use composition. In the case of end-use compositions concentration (a) above is usually between 0.01% and 2%, preferably between 0.1% and 1%. The composition may contain a single polymer or it may contain a blend of several polymers.

The free carboxylic acid is preferably, but not necessarily, the same as that of the metal carboxylate. However both are preferably selected from the group of those with the formula R·COOH where R is a hydrocarbon group with up to 30 carbon atoms. Particularly suitable acids are those in which R is a straight chain hydrocarbon group with 8 up to 21 carbon atoms and having less than 3 double bonds.

The prodegradant according to the invention is particularly suitable for increasing the rate of degradation of olefine polymers, olefine copolymers with other monomers copolymerisable with olefine monomers and blends of the olefine polymers and/or copolymers.

The preferred olefine polymers are:

(1) Homopolymers of ethylene, propylene, butene-1, 4-methyl pentene-1 and styrene.
(2) Copolymers of these with one another and other α-olefines.

The preferred olefine copolymers are those which contain at least 50% by weight of ethylene, propylene, butene-1, 4-methyl pentene-1 and/or styrene together with at least one of the following comonomers:

vinyl chloride
vinyl acetate
methyl acrylate
methyl methacrylate
acrylic acid
methacrylic acid
hydroxyethyl methacrylate The preferred olefine copolymers include the ionomers produced by neutralising or partially neutralising the carboxylic groups of those copolymers which contain carboxylic groups.

Copolymers which contain at least 50% by weight of ethylene are particularly suitable.

In addition to the polymer and the prodegradant a composition according to the invention may also include other additives which are conventionally incorporated in thermoplastics polymer compositions, for example in the case of polyolefines they may incorporate anti-blocking agents, slip agents, anti-static agents, stabilisers to stabilise the composition during processing as well as stabilisers to stabilise the composition during use (i.e. after processing has finished).

The invention includes wrapping material, string and containers (including lids for containers) made of the plastics composition described above. The following are examples of containers; bags, sacks, boxes, cartons, bottles, sachets, cups and cartridge cases.

The invention also includes an item of merchandise packed in a material made of a plastics composition as described above.

Several compositions according to the invention will now be described by way of example. In all the examples powdered ferric stearate and a powdered carboxylic acid or a liquid carboxylic acid dissolved in an alcohol (and in some cases an antioxidant) were milled with polyethylene. Milling was continued for 10 minutes after mixing had been achieved so as to form a crepe. The crepe was compression moulded between polyethylene terephthalate foils at a suitable temperature to give a coherent film 125 μm. thick. Samples 1 cm. x 3 cm. were cut from the foil and tested in the FS/BL Test.

FS/BL Test

The samples were exposed to UV irradiation using a combination of equal numbers of 20 watt fluorescent sunlamps and 20 watt black lamps. The samples circulated around the lamps at a distance of 10 cm. from the lamps. (The circulation helps to obtain uniform irradiation.) The samples were inspected daily and tested for flex-crack failure. The time to failure indicates the effect of the prodegradant, a shorter time indicating a more effective prodegradant.

Table 1 gives embrittlement times in the FS/BL Test (in days) on high density polyethylene samples which contained the stated quantities of ferric stearate (metal salt) and free stearic acid. Table 1 also includes results on samples which also contained 0.02% w./w. of BHT. (BHT is a conventional "name" for a common antioxidant the full chemical name of which is 2,6-ditertiarybutyl-4-methyl phenol.)

TABLE 1

| Metal salt, percent w./w. | Free acid, percent w./w. | Total prodegradant, percent w./w. | Free acid as percent of total prodegradant | Life in days at BHT conc. None | Life in days at BHT conc. 0.02 percent w./w. |
|---|---|---|---|---|---|
| 0.008 | 0.002 | 0.01 | 20 | 23 | ----- |
| 0.008 | 0.102 | 0.11 | 93 | 12 | 11 |
| 0.08 | 0.02 | 0.1 | 20 | 14 | 13 |
| 0.08 | 0.12 | 0.2 | 60 | ----- | 15 |
| 0.08 | 0.22 | 0.3 | 73 | 2 | 6 |
| 0.08 | 0.52 | 0.6 | 86.5 | 2 | ----- |

NOTE.—The blank, i.e. high density polyethylene with no additives, was 23 days.

Table 2 gives similar results on low density polyethylene which contained the stated quantities of ferric stearate (metal salt) and free stearic acid.

TABLE 2

| Meltal salt, percent w./w. | Free acid, percent w./w. | Total prodegradant, percent w./w. | Free acid as percent of total prodegradant | Life in days |
|---|---|---|---|---|
| Nil | Nil | Nil | | 50 |
| 0.008 | 0.002 | 0.01 | 20 | 35 |
| 0.08 | 0.02 | 0.1 | 20 | 20 |
| 0.20 | Nil | 0.2 | 0 | 24 |
| 0.10 | 0.10 | 0.2 | 50 | 19 |
| 0.08 | 0.12 | 0.2 | 60 | 17 |
| Nil | 0.20 | 0.2 | 100 | 35 |
| 0.08 | 0.22 | 0.3 | 73.4 | 15 |
| 0.08 | 0.52 | 0.6 | 86.5 | 18 |

The four results at 0.2% total prodegradant show that both the acid and the salt have prodegradant activity but the two together give an enhanced effect.

Table 3 shows the effect of adding a variety of other acids to the same base mixture. In all cases the mixture contains:

0.08% w./w. of ferric stearate
0.02% w./w. of stearic acid
0.1% w./w. of the other acid (as stated) (i.e. 0.2% w./w. total prodegradant and 60% free acid based on the total prodegradant).

TABLE 3

| Name of acid | No. of C-atoms | Type | Life in days |
|---|---|---|---|
| Benzoic | 7 | Aromatic | 19 |
| Pelargonic | 9 | Saturated | 14 |
| Lauric | 12 | do | 13 |
| Stearic | 18 | do | 18 |
| Oleic | 18 | 1 double bond | 15 |
| Linoleic | 18 | 2 double bonds | 18 |
| Behenic | 22 | Saturated | 18 |

Table 3 suggests that in the case of acids R·COOH where R is hydrocarbon, the nature of R does not have a large influence on the rate of degradation.

A result was obtained for the degradation of high density polyethylene using manganese stearate as prodegradant. With 0.6% w./w. of manganese stearate and 1% w./w. of stearic acid (i.e. 1.6% total prodegradant 62% of which is acid) the life in the FS/BL test was 2 days; without the acid the life was 9 days. The manganese stearate gave less colour than the iron.

The prodegradant effect of the synergistic combination of 0.08% ferric stearate and 0.02% stearic acid is exemplified by the results shown in Table 4 for a series of thermoplastics when exposed to FS/BL radiation.

TABLE 4

| Polymer | Life in Days | |
|---|---|---|
| | Prodegradant composition | Control |
| 7½% vinyl acetate/ethylene [a] | 34 | 75 |
| Polypropylene homopolymer [b] | 46 | 10 |
| Sorlyn' trademark A 1555 [c] | 13 | 71 |

[a] MFI 2.0; density 0.926 g./cc. The film was compression moulded to 125 μm.
[b] The polypropylene was stabilised by 0.1% of calcium stearate and 0.1% of 2:6 di-tertbutyl-4-methyl phenol and blown at 220° C. to 20 μm.
[c] A partially neutralised copolymer of ethylene and methacrylic acid compression moulded to 125 μm. thick film.

I claim:
1. A thermoplastic composition of an olefin homopolymer or copolymer which contains as prodegradant a free carboxylic acid and a metal salt of a carboxylic acid said metal having an atomic number of 22 to 29 and in which the free carboxylic acid and the carboxylic acid of the metal carboxylate are both selected from the group R·COOH where R is a hydrocarbon group with up to 30 carbon atoms, each being present in such a concentration that:
   (a) the total amount of metal salt+free carboxylic acid is between 0.001% and 40% by weight based on the total composition;
   (b) the amount of free carboxylic acid is from 10% up to 95% by weight of the total amount of metal salt plus free carboxylic acid.
2. A thermoplastics composition according to Claim 1, in which the amount of free carboxylic acid is from 50% up to 90% by weight of the total amount of metal salt plus free carboxylic acid.
3. A thermoplastics composition according to Claim 1, where R is a straight chain hydrocarbon group with 8 up to 21 carbon atoms and having less than 3 double bonds.
4. A thermoplastics composition according to Claim 3, where R is the group $C_{17}H_{35}$.
5. A thermoplastics composition according to Claim 1, in which the free carboxylic acid is the same as that of the metal carboxylate.
6. A thermoplastics composition according to Claim 1, in which the metal of the carboxylate is iron.
7. A thermoplastics composition according to Claim 1, in which the metal of the carboxylate is manganese.
8. A thermoplastics composition according to Claim 1, in which the olefine homopolymer or copolymer is an ethylene homopolymer or copolymer which contains at least 50% by weight of ethylene monomer.
9. A thermoplastics composition according to Claim 8, in which the polyolefine is a homopolymer of ethylene.
10. A thermoplastics composition according to Claim 1, in which concentration (a) is between 0.01% and 2% by weight.
11. A thermoplastics composition according to Claim 10, in which concentration (a) is between 0.1% and 1% by weight.

References Cited
UNITED STATES PATENTS 3,454,510   7/1969   Newland et al. _____ 260—23
3,274,731   9/1966   Vigneault et al. ___ 260—Dig. 43

OTHER REFERENCES

Macromolecules, vol. 2, No. 6, November to December 1969, ACS publication, pp. 587–596.
Polymer Preprints, vol. 12, No. 2, September 1971, ACS publication, pp. 81–90.

VERONICA P. HOKE, Primary Examiner

U.S. Cl. X.R.
260—Dig. 43, 23 H, 93.7

UNITED STATES PATENT OFFICE
CERTIFICATE OF CORRECTION

Patent No. 3,840,512                    Dated October 8, 1974

Inventor(s) Derek Samuel BRACKMAN

It is certified that error appears in the above-identified patent and that said Letters Patent are hereby corrected as shown below:

In the heading, add the following information:

Foreign Application Priority Data

--Great Britain      November 24, 1971      54566/71--

Signed and sealed this 7th day of January 1975.

(SEAL)
Attest:

McCOY M. GIBSON JR.                C. MARSHALL DANN
Attesting Officer                  Commissioner of Patents